Jan. 27, 1970  J. D. VAN ATTEN  3,492,391
METHOD FOR PRODUCING DECORATIVE PLASTIC PANELS
Filed March 18, 1968  6 Sheets-Sheet 1

INVENTOR.
JASPER D. VAN ATTEN
BY
Lloyd␣Andrus

Jan. 27, 1970       J. D. VAN ATTEN       3,492,391
METHOD FOR PRODUCING DECORATIVE PLASTIC PANELS
Filed March 18, 1968                    6 Sheets-Sheet 2
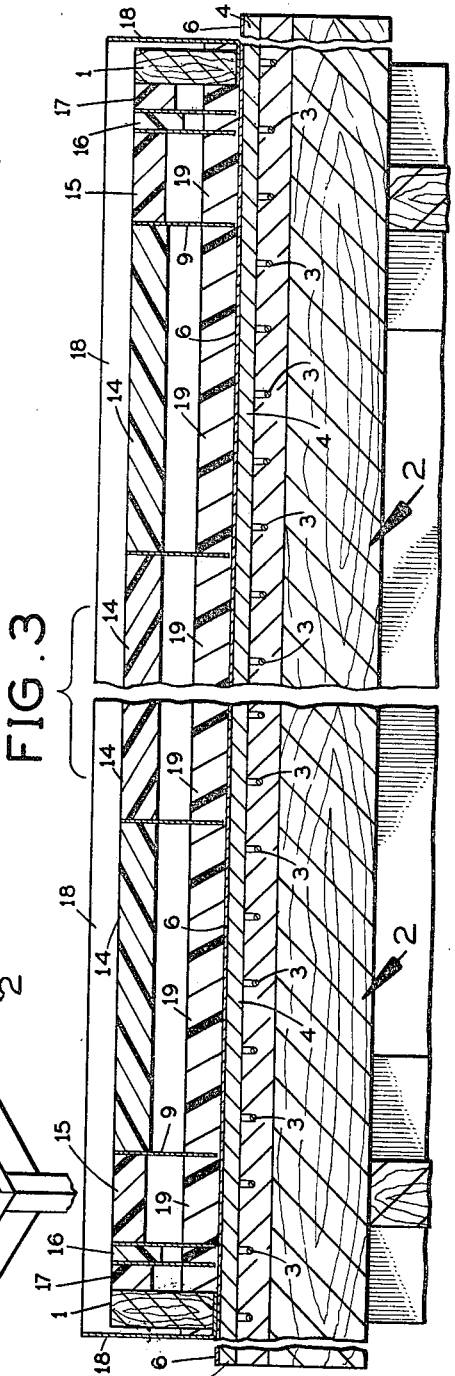
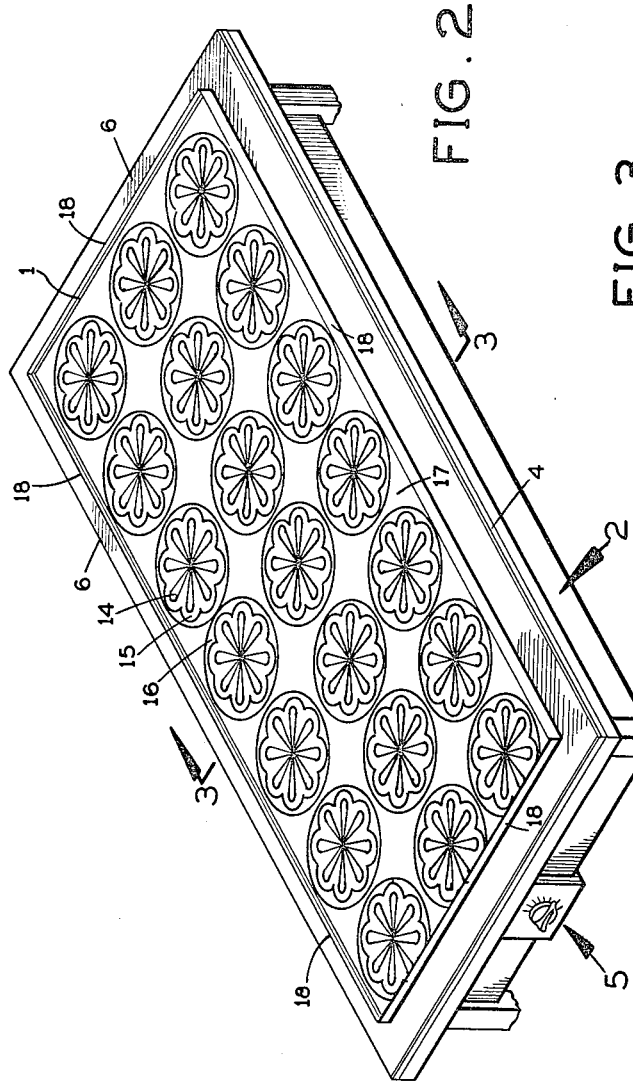
INVENTOR.
JASPER D. VAN ATTEN
BY
Lloyd J. Andres

INVENTOR.
JASPER D. VAN ATTEN

INVENTOR.
JASPER D. VAN ATTEN
BY

Jan. 27, 1970 J. D. VAN ATTEN 3,492,391
METHOD FOR PRODUCING DECORATIVE PLASTIC PANELS
Filed March 18, 1968 6 Sheets-Sheet 5

INVENTOR.
JASPER D. VAN ATTEN
BY

Jan. 27, 1970   J. D. VAN ATTEN   3,492,391

METHOD FOR PRODUCING DECORATIVE PLASTIC PANELS

Filed March 18, 1968   6 Sheets-Sheet 6

INVENTOR.
JASPER D. VAN ATTEN
BY

United States Patent Office 3,492,391
Patented Jan. 27, 1970

3,492,391
METHOD FOR PRODUCING DECORATIVE PLASTIC PANELS
Jasper D. Van Atten, 226 San Sebastian Ave., Coral Gables, Fla. 33834
Filed Mar. 18, 1968, Ser. No. 713,792
Int. Cl. B29c 9/00; B32b 3/10; B28b 7/22
U.S. Cl. 264—245      7 Claims

ABSTRACT OF THE DISCLOSURE

A method for molding multi-color shapes within predetermined partitions for forming patterns and/or figures from liquid plastic material and curing same into rigid decorative panels.

---

This invention relates in general to a method for producing plastic panels, and more particularly to double layer sandwich panels which include decorative molded forms and shapes formed by partitions and utilizing a wide variety of colors.

Prior panels of this general character included the lamination of transparent film having decorative designs painted or printed thereon. Other prior laminated decorative panels include the well known prefabricated honeycomb structures and the like for retaining various colored media sandwiched between two transparent or translucent panels.

These structures are not only expensive to produce, but greatly limit the artistic effects which may be produced by laminated or honeycomb elements, which effects are ordinarily limited to repeated well known geometric figures.

The present invention overcomes the above objections and disadvantages by the provision of a method for constructing a durable panel of uniform thickness, at relatively low cost, for use as decorative windows or wall panels in which the decorations may assume a wide range of three dimension artistic color designs including the reproduction of stylized living forms or three dimensional geometric figures and patterns.

These and other objects and advantages in one embodiment of the method are described and shown in the following specification and drawings, in which:

FIG. 2 is a fragmentary perspective view in reduced scale of a table on which a decorative panel is in the final stage of processing.

FIG. 3 is a fragmentary cross sectional end view taken through section line 3—3, FIG. 2.

Figure 1:
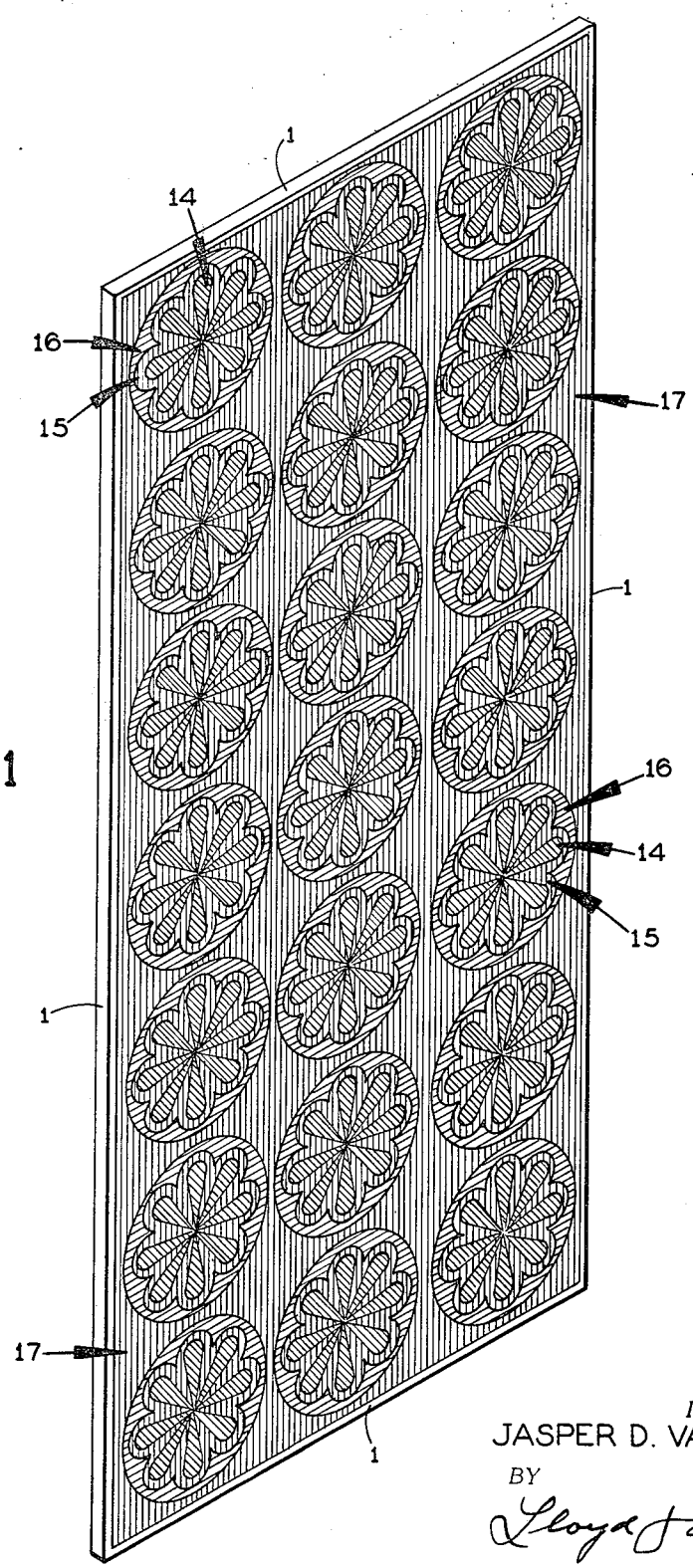
FIG. 1 is a perspective view of a finished two layer decorative panel in reduced scale.

Referring to FIGS. 1, 2, and 3, the finished plastic decorative panel, shown in FIG. 1, is molded within and secured within the confines of a frame 1, usually, but not necessarily, rectangular and preferably made of wood. Two table or bench assemblies 2, or other horizontal planar surfaces, are required to complete the method of processing. A cross section of a typical table or bench is shown in FIG. 3, in which a plurality of electric heating elements 3 are imbedded in slots along the top thereof and covered by a planar aluminum sheet 4 secured in intimate contact with the table top which will be heated to a temperature, to be hereinafter described, under the control of a well known control means 5, not shown in detail.

Figure 4:
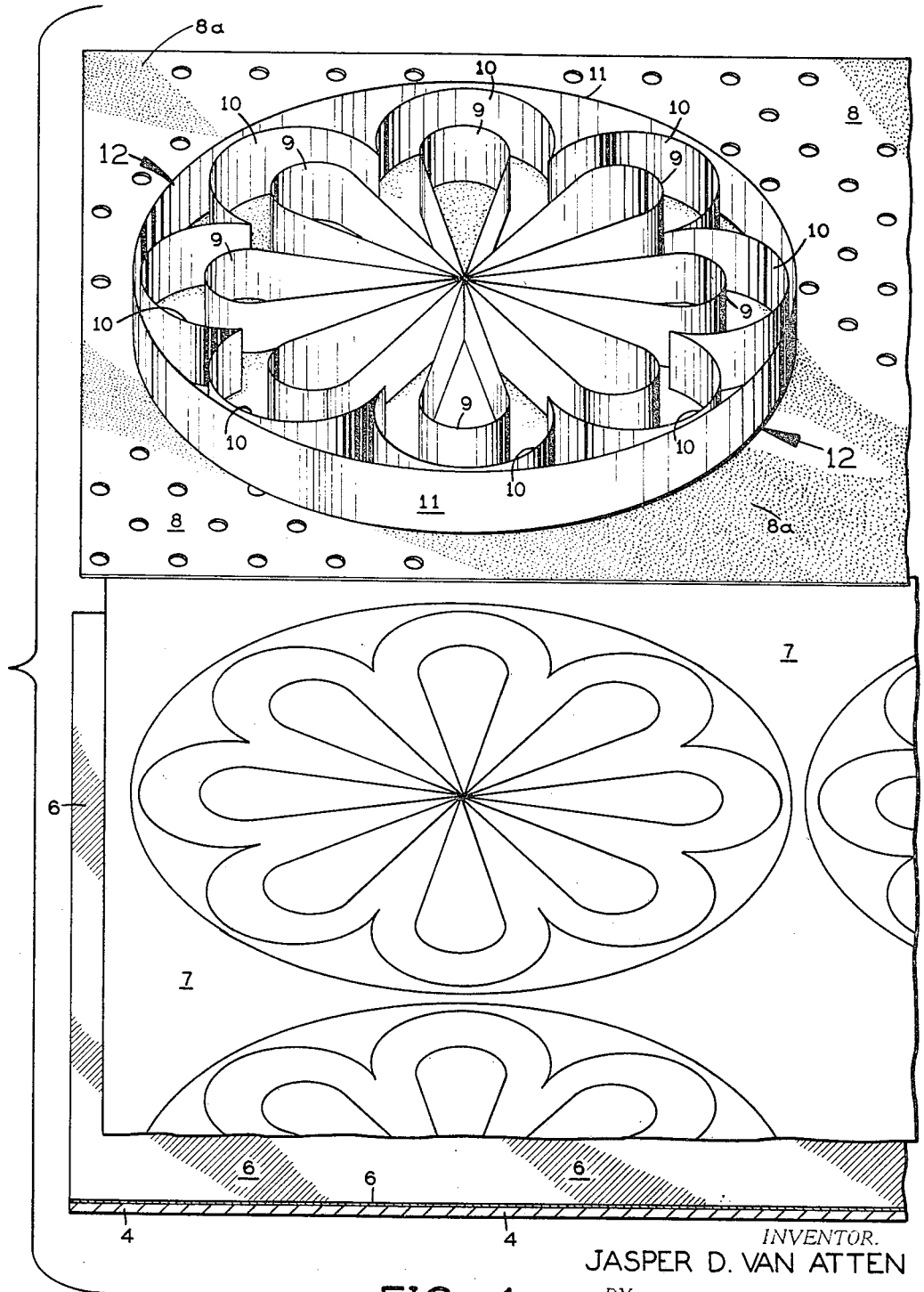
FIG. 4 is a fragmentary exploded perspective view of the elements for a panel in a primary step of the method of construction.

Referring to FIG. 4, the smooth upper surface of the aluminum sheet on each of the pair of tables has thereon a thin layer of a parting material 6, such as sheet Teflon or a white laminate such as Formica, bonded thereto for parting purposes in order to release partial or complete panels formed thereon and to maintain a polished surface for the production of subsequent panels.

As a first step in the method for producing one side of the panel and with the heating elements de-energized, the desired design is drawn in outline on velum or suitable drawing paper in full scale, as illustrated by the drawing 7, shown in FIG. 4, which drawing is placed upon the release coated surface of one of the table tops.

A transparent perforated plastic film 8, such as Mylar, having a pressure sensitive adhesive 8a on one side thereof, is placed on the upper surface of the drawing on the table with the adhesive side uppermost which completes a second step of the processing.

In a preferred form, the desired design is outlined by short or long grain jute or kraft paper stock or other thin flexible material in the form of strips 9, 10, and 11, of predetermined thickness and width, which strips are formed into the shape of the desired design, which is illustrated in a typical simple rosette 12, shown in FIG. 4, in which a plurality of loops are positioned within the circle and edgewise secured to the film 8 by the contact of the lower edges of all of the design elements with the adhesive 8a. Ordinary lightweight short grain jute strips are used for sharp or small bends or curves, whereas heavy weight long grain jute stock is used for straight lines without crimping or sharp angle bends.

It is to be noted that this particular rosette forms partitions for three groups of eight like shapes.

Figure 5:
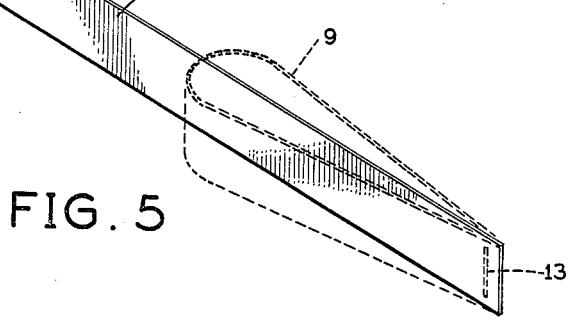
FIG. 5 illustrates a typical formation of one of the sheet material elements for forming a portion of the design shown in FIG. 4.

Referring to FIG. 5, the forming of a typical design element 9 is shown formed in dotted lines and retained by a staple 13.

In the case of complex recurring designs, such as the rosette just shown, the various elements thereof may be edge bonded to separate pieces of film 8 by the adhesive 8a, for the convenient placement thereof.

A fourth step in the method requires each design assembly, in this case each rosette, to be manually positioned over the drawing 7, which is visible through film 8, and bonded to the adhesive 8a in accurate register with the corresponding design on the drawing. After the design is secured, the drawing may be removed for future use. Thus it is a relatively simple matter to provide accurate relationship to each portion of the overall ornamental design with the original drawing.

Figure 6:
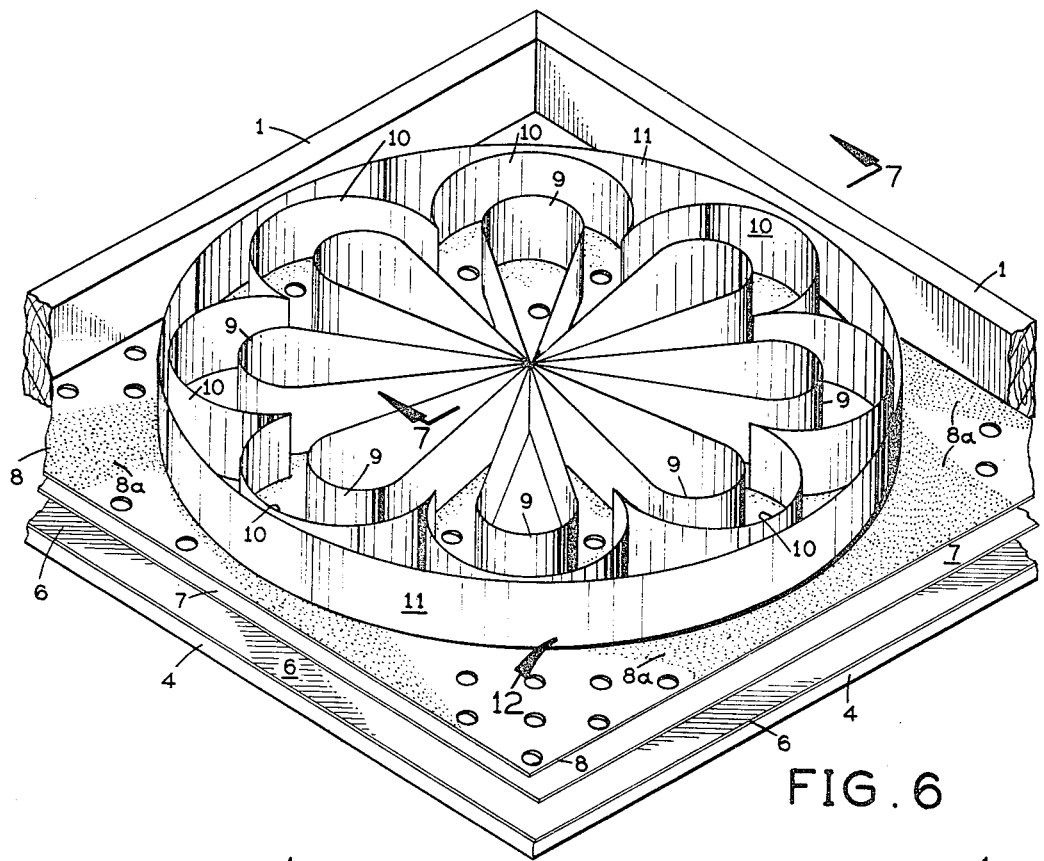
FIG. 6 is a fragmentary perspective view of the design shown mounted on other elements used in the method.
Figure 7:
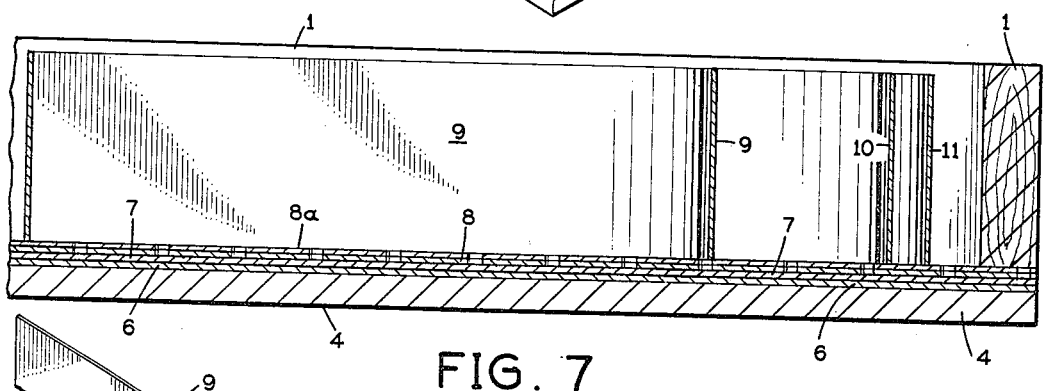
FIG. 7 is a fragmentary cross sectional view taken through section line 7—7, FIG. 6.

FIGS. 6 and 7 illustrate the relationship of the elements, adhesive, film, drawing, parting layer and aluminum sheet when prepared for step 5, as follows.

Figure 8:
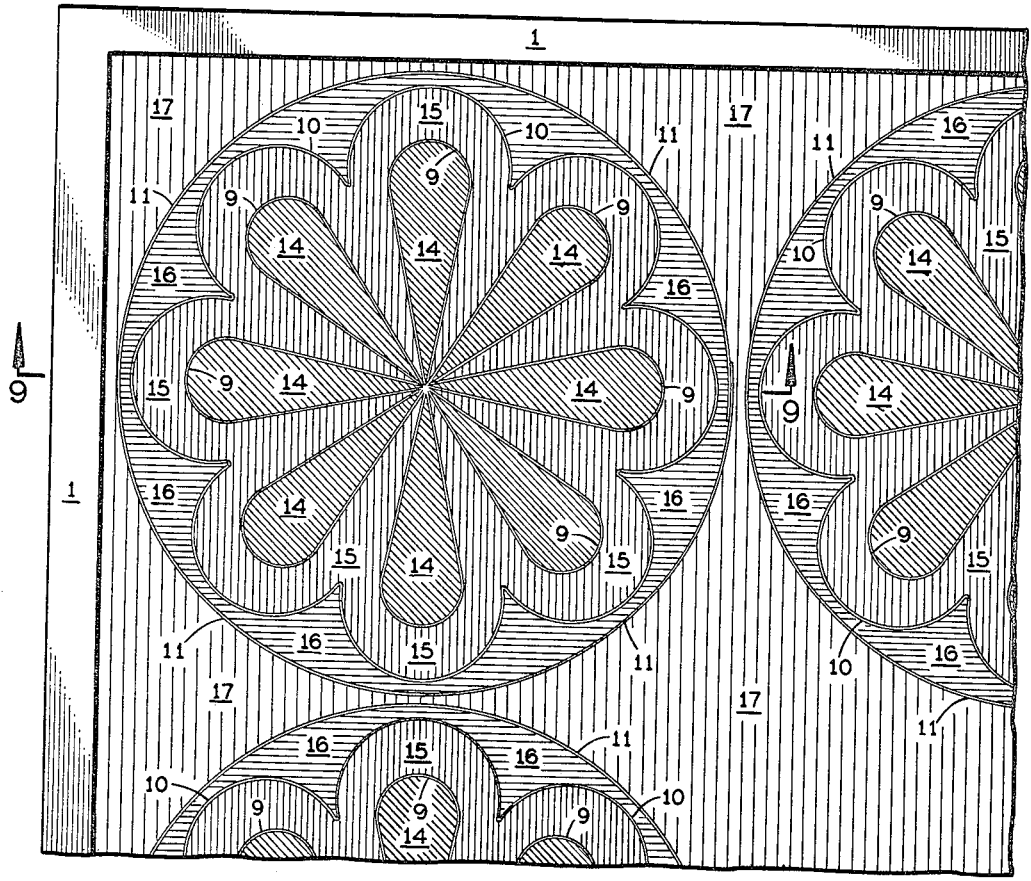
FIG. 8 is a fragmentary plan view of the panel with multi-colored liquid plastic selectively poured in and around the design shown in FIG. 6.
Figure 9:
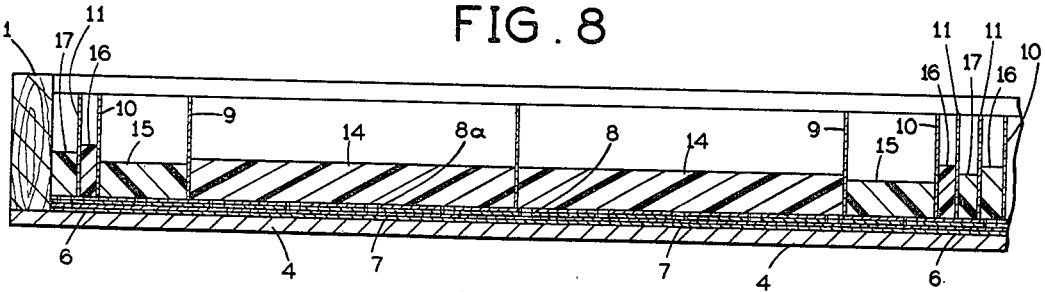
FIG. 9 is a fragmentary cross sectional elevation taken through section line 9—9, FIG. 8.
Figure 10:
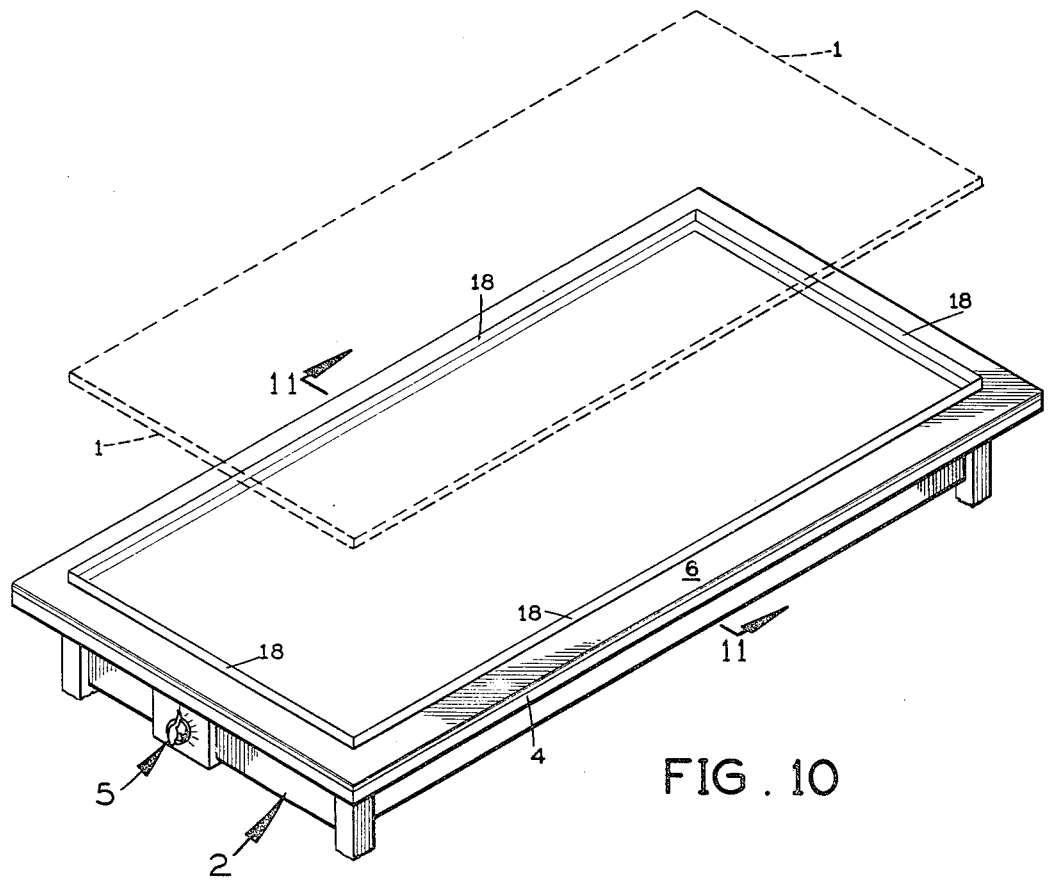
FIG. 10 illustrates the transfer of a first processed side of a partially completed panel to a second table for completion.
Figure 11:
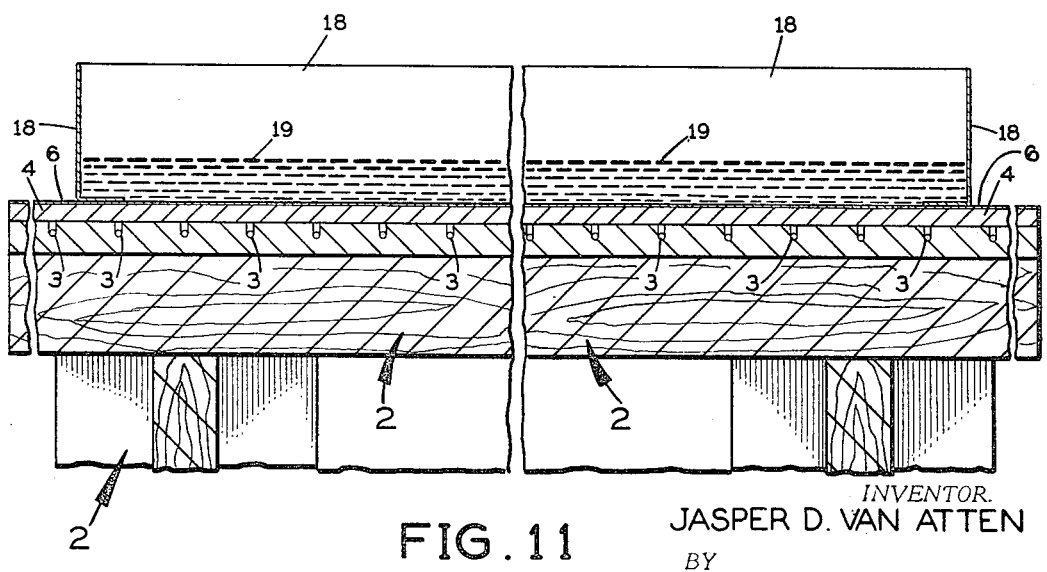
FIG. 11 illustrates a fragmentary cross sectional elevation for the pouring of the opposite sides of the panels shown in FIGS. 8 and 9.

Step five of the method is illustrated in FIGS. 8 and 9 wherein colored liquid plastic of three colors 14, 15, and 16, such as polyester resin, are selectively and sequentially poured in the voids between the partitions 9, 10 and 11 to a predetermined height not to exceed half the height of the jute partitions. An overall outline plastic resin 17, of predetermined color and having mixed therewith a predetermined type and quantity of catalyzer, is poured into the void between the design elements 11 and the frame 1.

The heater elements 3 are then energized and the temperature of the aluminum plate is raised to approximately 150 degrees Fahrenheit for a predetermined period for the rapid curing and solidification of all portions of the liquid plastic within the frame 1.

It is to be noted that the specific temperature and curing time period are related directly to the curing properties of the particular plastic used.

It is also to be noted that the sheet 8 requires the perforations to maintain stability during the heating phases. Since the electric elements on the table result in the emission of heat, which in turn results in the curing action of the resin and its catalyst, which also radiates heat, the plurality of holes in the Mylar sheet permits the escape of heat and any entrapped gas and also prevents the adhesive on the Mylar from liquifying and contaminating the upper surface of the resin.

During the curing of the first or ornamental side of the panel, the second table assembly, like the first table, is prepared for the molding of the opposite side of the panel by first securing a vertical rectangular wall 18, preferably made by paper or other strips of solid material, having pressure sensitive adhesive on one side thereof, secured on the surface of the parting material 6 on the top of the table and having an inside dimension slightly larger than the outside dimensions of the frame 1. Another portion of liquid plastic 19 is poured into the void confined by wall 18 to a predetermined depth, forming the second or opposite side of the panel. Then the solidified ornamental panel, shown in FIGS. 8 and 9, is removed from the first table, inverted and lowered in register with and within the wall 18 and weighted for depression therein to a predetermined depth. This portion of the process traps air under compression in all of the voids between the ornamental side previously cured and the non-ornamental side now on the second table.

The aluminum top of the second table is then heated by the elements 3 to a predetermined temperature for a curing period which will cure and solidify the plastic 19 and complete the formation of the rigid panel, which is readily parted from the parting material 6 on the table when the walls 18 are removed.

It is also to be noted that the Teflon coating on the tables is useful only during the removal of the final non-ornamental side of the panel.

In the interest of economy, the film 8 which is retained by adhesive 8a on the ornamental side of the panel is manually removed with the adhesive side in contact and sandwiched with a sheet of silicone or Teflon coated kraft paper or other quick release anti-adhesive paper, which may be rolled for storage and future use. When required for a subsequent panel, the film 8 is removed from the silicone paper and placed in proper relation over the drawing on the table, as previously described.

It is also to be noted that other solids or semi-solids may be used in place of the aforesaid strip type ornaments with corresponding results.

Having described my invention, I claim:

1. The method of producing decorative plastic panels consisting of a first step of placing a full scale outline drawing of the panel to be produced including the decorative design thereon on a first fixed horizontal planar surface,
 a second step of covering said drawing with a transparent plastic film which is coated with a pressure senstive adhesive on the uppermost side thereof,
 a third step of placing a fixed frame means of predetermined height on said film in coincidence with the perimeter of the panel shown on said drawing,
 a fourth step of preparing the design elements in said panel in accordance with the design on said drawing consisting of shaping ribbon-like sheet material of predetermined width and thickness by forming same into said design with the opposite edges thereof in parallel planes,
 a fifth step of placing said design elements in adhesive bonding contact with the uppermost said adhesive side of said film coinciding with the visible outlines of the design on said drawing for holding said design in fixed relation to said frame means,
 a sixth step of pouring a pre-catalyzed liquid plastic material of predetermined color into said design and permitting same to gravitate to a level substantially equal to half of the said width of said ribbon-like material and the pouring of liquid plastic of a different color into the area between said design and said frame for gravitation to a height substantially equal to half the said width of said ribbon-like material,
 a seventh step of electrically heating the said planar surface to a predetermined temperature for a predetermined time for rapidly curing said plastic material into a solid,
 an eighth step of forming a retaining wall on a second horizontal adhesive resistant planar surface with said wall shaped for close proximity relation to the outside perimeter of said frame,
 a ninth step of pouring a second liquid plastic of a second predetermined color for gravitation onto said surface within the confines of said wall to a predetermined uniform depth,
 a tenth step of removing the first side of said panel formed on said first surface and inverting and placing same onto said second plastic within the confines of said wall under predetermined pressure,
 a final step of heating said second surface by electric means and curing said second plastic material completing said panel and removing said frame containing the finished panel from said wall and said second surface.

2. The method recited in claim 1 including the use of a plurality of said design elements forming areas separated by said ribbon-like material.
 liquid plastic material of contrasting color is poured into each of said areas respectively and permitting same to gravitate to a level substantially equal to half of the said width of said ribbon-like material.

3. The method recited in claim 1 including the use of said transparent plastic film with spaced perforations therein for preventing distortion thereof and permitting the escape of gas when said plastic material is cured.

4. In a method of producing decorative plastic panels of the character described a first step of placing a full scale drawing of the panel to be produced including the decorative design thereon on a first horizontal planar surface,
 a second step of placing in intimate contact over said drawing a transparent plastic film with said plastic having a pressure sensitive adhesive on the uppermost side thereof,
 a third step of placing a frame of predetermined dimensions and height on said film in coincidence with the perimeter of the panel shown on the drawing,
 a fourth step of preparing the design element for said panel in accordance with the design on said drawing consisting of shaping flexible sheet material of predetermined width and thickness into forms corresponding with the said design on said drawing with the opposite edges of said sheet material in parallel planes,
 a fifth step of placing the edges of said design element positioned in one plane in adhesive bonding contact with said adhesive and in coincidence with the outline of the design visible through said film for holding said design in fixed relation to said frame means, a sixth step of pouring liquid plastic material of a first color into said design for gravitation to a height equal to about one-half the width of said sheet material and pouring a liquid plastic of a second color into the area between said design and said frame for gravitational to a height substantially equal to the height of the first color, a seventh step of electrically heating said planar surface to a predetermined temperature for rapidly curing said plastic material into a solid, an eighth step of forming a retaining wall on a second horizontal adhesive resistant planar surface with said wall shaped for close proximity relation to the outside perimeter of said frame, a ninth step of pouring a second liquid plastic of a predetermined color for gravitation onto said surface within the confines of said wall to a predetermined uniform depth, a tenth step of removing the panel formed on said first surface and inverting and placing same onto said second plastic within said retaining wall with said sheet material forming said design embedded in said second plastic, a final step of electrically heating said second surface and curing said second plastic material for completing a laminated panel and removing said frame containing the finished panel from said wall and said second surface.

5. The method recited in claim 4 in which said horizontal planar surface is formed of smooth metal sheet including a coating of Teflon on the uppermost surface thereof and including electric heating means thereunder for raising the temperature of said metal sheet to a predetermined degree for the rapid curing of the pre-catalyzed liquid plastic material thereon and readily removing same when cured to a solid by the non-adherence of said Teflon.

6. The method recited in claim 4 in which said horizontal planar surface is formed of smooth metal sheet including a coating of white lamination of Formica on the uppermost surface thereof and including electric heating means thereunder for raising the temperature of said metal sheet to a predetermined degree for the rapid curing of the pre-catalyzed liquid plastic material thereon and readily removing same when cured to a solid by the non-adherence of said white lamination of Formica.

7. The method recited in claim 4 including a sheet of paper having anti-adhesive properties and manually engaging the adhesive side of said transparent plastic film as it is removed from said panel for preserving said film for future use.

References Cited

UNITED STATES PATENTS

| | | | |
|---|---|---|---|
| 178,308 | 6/1876 | Leathers et al. | 25—123 X |
| 1,137,595 | 4/1915 | Eyl | 264—247 |
| 3,351,689 | 11/1967 | Bushcott et al. | 264—247 X |
| 3,384,955 | 5/1968 | Pierce | 264—272 X |
| 3,409,715 | 11/1968 | Schomann | 264—250 |

ROBERT F. WHITE, Primary Examiner

K. J. HOVET, Assistant Examiner

U.S. Cl. X.R.

249—78; 264—253, 254, 316